United States Patent [19]

Thuen et al.

[11] Patent Number: 5,031,931
[45] Date of Patent: Jul. 16, 1991

[54] VELOCITY CHANGE SENSOR WITH SPRING BIAS

[75] Inventors: Torbjorn Thuen, Morris Plains; Harald S. Husby, Budd Lake; Allen K. Breed, Boonton Township, Morris County, all of N.J.

[73] Assignee: Breed Automotive Corporation, Boonton Township, Morris County, N.J.

[21] Appl. No.: 447,108

[22] Filed: Dec. 6, 1989

[51] Int. Cl.⁵ .................. B60R 21/32; H01H 35/14
[52] U.S. Cl. ........................... 280/735; 200/61.53; 200/61.49; 200/61.45 R
[58] Field of Search .......... 200/61.45 R, 61.52, 200/61.48, 61.49, 61.53, 61.51; 180/282; 280/734, 735

[56] References Cited

U.S. PATENT DOCUMENTS

| | | | |
|---|---|---|---|
| 3,623,449 | 11/1971 | Krutson | 200/61.53 |
| 3,673,367 | 6/1972 | Kaiser | 280/735 |
| 4,020,302 | 4/1977 | Hasegawa . | |
| 4,266,107 | 5/1981 | Abbin . | |
| 4,594,485 | 6/1986 | Brown, Jr. | 200/61.45 R |
| 4,900,880 | 2/1990 | Breed | 200/61.45 M |

FOREIGN PATENT DOCUMENTS

| | | |
|---|---|---|
| WO88/08613 | 11/1988 | PCT Int'l Appl. . |
| 1386421 | 3/1975 | United Kingdom . |
| 1519698 | 8/1978 | United Kingdom . |
| 2051482 | 1/1981 | United Kingdom . |
| 1586611 | 3/1981 | United Kingdom . |
| 2086484 | 5/1982 | United Kingdom . |

Primary Examiner—Charles A. Marmow
Assistant Examiner—Karin Tyson
Attorney, Agent, or Firm—Kane Dalsimer Sullivan Kurucz Levy Eisele and Richard

[57] ABSTRACT

An accelerometer for a passenger restrain system in a motor vehicle includes a housing with a path for an inertial element, and spring members for urging the inertial element toward a preselected position. When the vehicle decelerates at a rate higher than a preset rate, the ball moves away from the preselected position and closes an electrical contact. A closed chamber may be used as a dampening element for the inertial element.

13 Claims, 3 Drawing Sheets

VELOCITY CHANGE SENSOR WITH SPRING BIAS

BACKGROUND OF THE INVENTION

1. Field of the invention

This invention pertains to a velocity change sensor or accelerometer used in motor vehicles for detecting sudden changes in velocity and for activating in response a passenger restraining device such as an air bag. More particularly, this device includes an element which moves to a preset position in response to a sudden deceleration to close pair of contact blades, said device also having a spring for biasing the element.

2. Background of the Invention

Studies have been made which indicate that injuries in motor vehicle accidents, especially at high speeds, can be substantially reduced or eliminated by the use of passenger restraint systems. (The term "passenger" is used to cover the driver of a car as well.) These systems include an inflatable balloon usually termed an air bag which normally is stored away in the instrument panel or the steering wheel. When the motor vehicle is subjected to a sudden deceleration, the air bag is inflated and is deployed automatically in a position which cushions the passengers, restrains their movement and prevents contact between them and the automobile interior such as the windshield, the steering wheel. The instrument panel and so on. Of course, a crucial element of all such systems is the velocity change sensor or accelerometer which initiates the inflation and deployment of the air bags. The motion of the motor vehicle must be carefully and precisely monitored so that the air bags can be deploted very fast, before the passengers suffer any substantial injury.

A velocity change sensor is disclosed in U.S. Pat. No. 4,329,549 assigned to the same company as the present invention. This sensor comprises a tubular housing surrounding a metallic shell, a metal ball and a magnet biasing the ball toward a first end of the shell. At the second end of the shell there are a pair of electrical contact blades. The sensor is positioned in the motor vehicle in an orientation such that when the motor vehicle experiences a deceleration which exceeds a preset level, the ball moves from the first toward the second end, making contact with the two blades. Because the blades and the ball are made of an electrically conducting material, when the ball contacts the blades, an electrical path is established between the two blades. This electrical path is used to initiate a signal for the deployment of the air bags.

Because the contacts must have a certain inherent flexibility they are normally made of steel, copper or an alloy thereof, while the ball is usually gold plated to insure a good electrical contact between the ball and the contact blades. Because of the difference in the electrochemical activity between these materials, corrosion due to electrolysis may occur which may form an insulating layer on the balls and/or the contact blades, thus causing the sensor to malfunction. This problem is further aggravated if the chamber holding the ball and the contacts is open to the atmosphere because fumes and other contaminants from the automobile engine.

Another problem with the prior art sensor described above is that the biasing force on the ball is generated by a permanent magnet. Since the magnet has to generate a relatively strong magnetic field, it is large and waste space.

OBJECTIVES AND SUMMARY OF THE INVENTION

In view of the above mentioned disadvantages of the prior art, it is an objective of the present invention to provide a restraint system in which the an inertial element is biased toward a preselected position by a spring means, thereby eliminating the need for a permanent magnet.

A further objective is to provide a passenger restraint system with a sensor wherein an inertial element does not form a part of the electrical circuit used to activate an air bag, thereby eliminating the need of expansive coating on the element.

Yet another objective is to provide a passenger restraint system with a small and inexpensive accelerometer. Other objectives and advantages of the invention shall become apparent from the following description of the invention.

A passenger restraint system constructed in accordance with this invention comprises a housing with an inertial element movable in a predetermined path, and spring means for biasing said element in a predetermined direction. In a crash, deceleration causes the inertial element to move along the path causing a change of state in a pair of electrical contacts coupled to an activation circuit for activating a restraint device such as an air bag. Preferably, the spring means is an integral of one of the contacts whereby the need for a separate spring is eliminated.

DETAILED DESCRIPTION OF THE INVENTION

Figure 1:
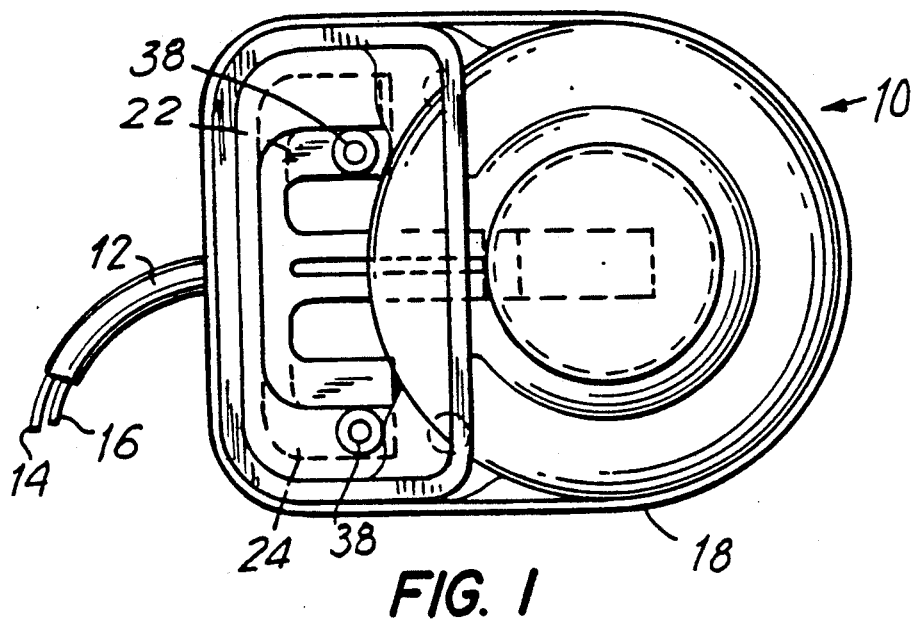
FIG. 1 shows a plan view of a sensor for a restraint device constructed in accordance with the invention.

In the following, terms such as up, down, above, below, vertical, horizontal, and so on, are used merely for facilitating the description of the invention. Turning now to the Figures, an accelerometer or velocity change sensor 10 constructed in accordance with this invention is usually disposed in a case mounted on the motor vehicle (not shown). The sensor is connected by a cable 12 with at least two conductors 14, 16 to a control device for the deployment of the air bag, described in more detail below.

The sensor has a generally tubular housing 18 made of nonconducting material such as a moldable plastic material, and has a cylindrical side wall 20. Inside the housing, there are provided two contact blades 22, 24, having extensions generally perpendicular to side wall 26. Blade 22 includes a first extension 28 and a second extension 30 offset from he first extension by a curved section 32. Blades 22 and 24 are affixed to a bottom wall 36 of the housing by pins 38, 38 respectively.

Figure 3:
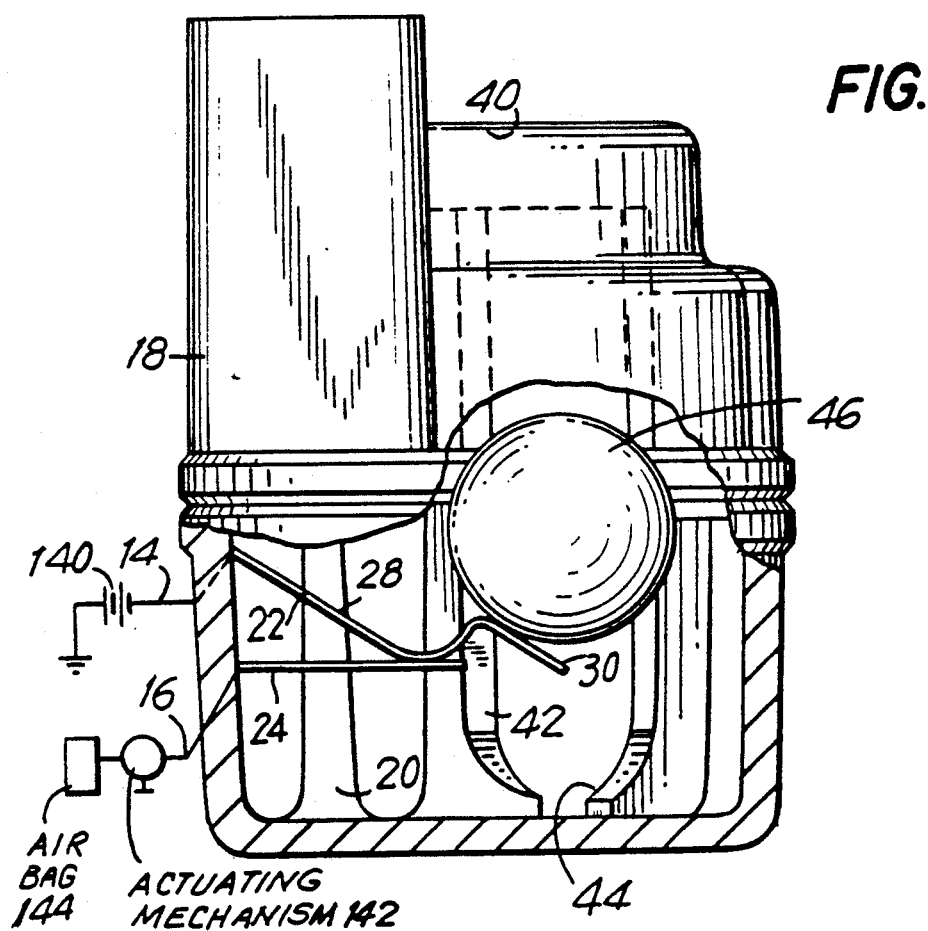
FIG. 3 shows a side elevational partial sectional view of the sensor of FIG. 3 with the inertial element in an intermediate position.

Housing 18 also has an upper wall 40. A plurality of ribs 42 extend downwardly from wall 40. At their lower ends, the ribs include arcuate portions 44. Between the ribs 42 there is an inertial element in the form for example, of a spherical ball 46 made of steel, or other relatively dense material. The ribs are arranged and constructed to form a vertical( as seen in FIGS. 3 and 4) tubular path for the ball 46.

Figure 2:
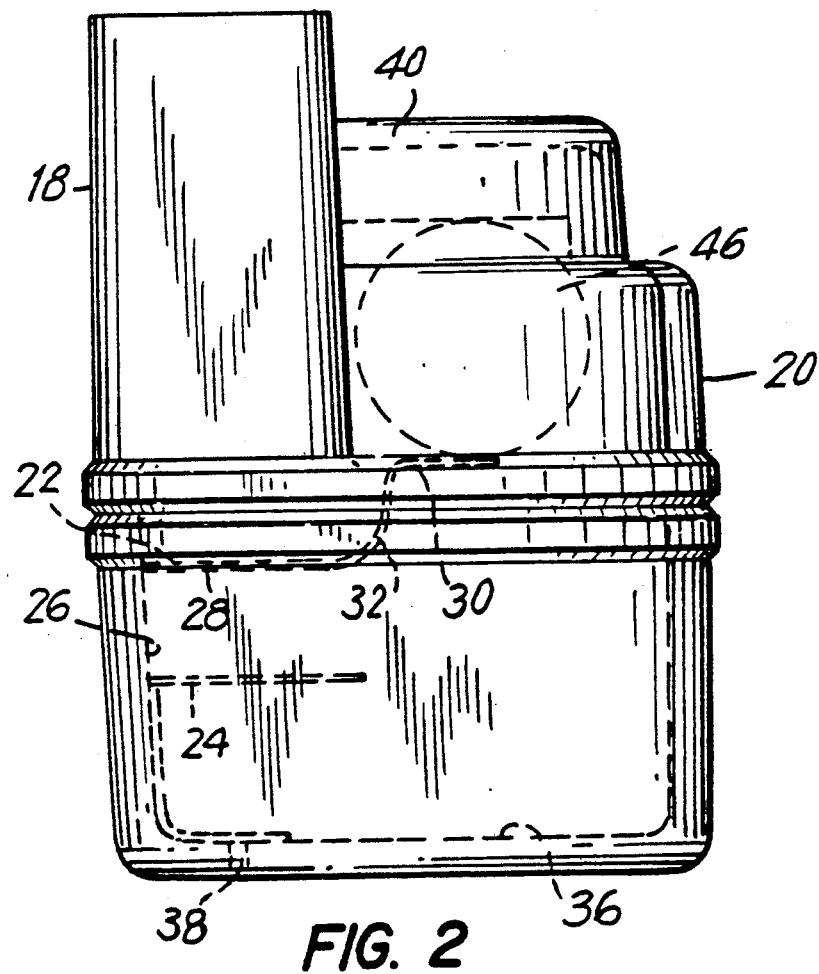
FIG. 2 shows a side elevational view of the sensor of FIG. 1.

The blades 22, 24 are made of a flexible conductive material such as steel, copper, or alloys thereof. As shown in FIG. 2, the blade 28 has a first extension 28 is arranged so that under normal conditions it applies a biasing force upward on ball 46 to maintain it in a rest position.

The sensor is positioned in such an orientation that, when the vehicle is involved in a crash which results on a deceleration exceeding a preset level, the ball 46 overcomes the biasing force of blade 22 and starts moving downwards along the path defined by the ribs 42. As the ball moves downward, it bends blade 22 until this blade comes into electrical contact with blade 24 as shown in FIG. 3. The blades are part of an electrical circuit, or other means of initiating of the bag deployment. For example, blade 22 may be coupled to a battery 40 through conductor 14, while blade 24 could be coupled to a an actuating mechanism 42 through conductor 16. When the two blades 22, 24 touch, current flows from battery 40 to the mechanism 42 deploying air bag 44 ( see FIG. 3).

Figure 4:
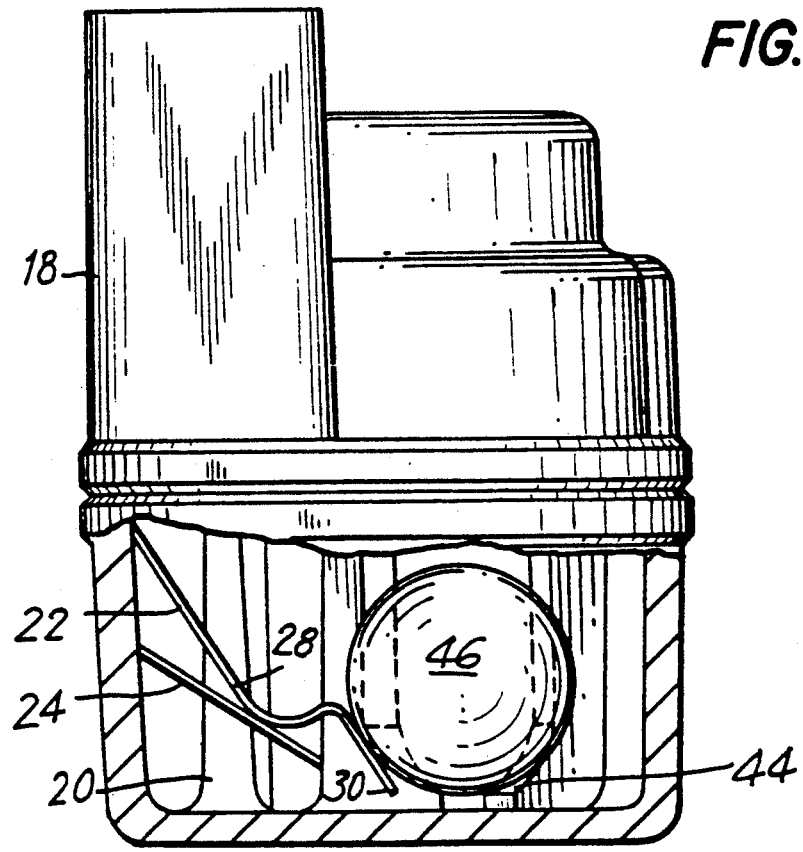
FIG. 4 shows the sensor of FIG. 3 with the inertial element in an end position.

After the two blades come into electric contact, if the deceleration on the vehicle is large enough, the ball continues its downward movement bending both blades 22, 24 until it is stopped by arcuate rib sections 44, as shown in FIG. 4. The combined forces of blades 22, 24 slow the ball down in this last movement reducing the impact between the ball 46 and housing 18.

Once the deceleration stops, the ball is returned to its rest position of FIG. 2 by the blades.

If the sensor is disposed in a relatively clean environment, such as for example, the passenger compartment of the vehicle, the interior of housing 18 need not be sealed. Therefore the sensor of FIGS. 1-4 can be made easily and inexpensively by standard molding techniques.

Figure 5:
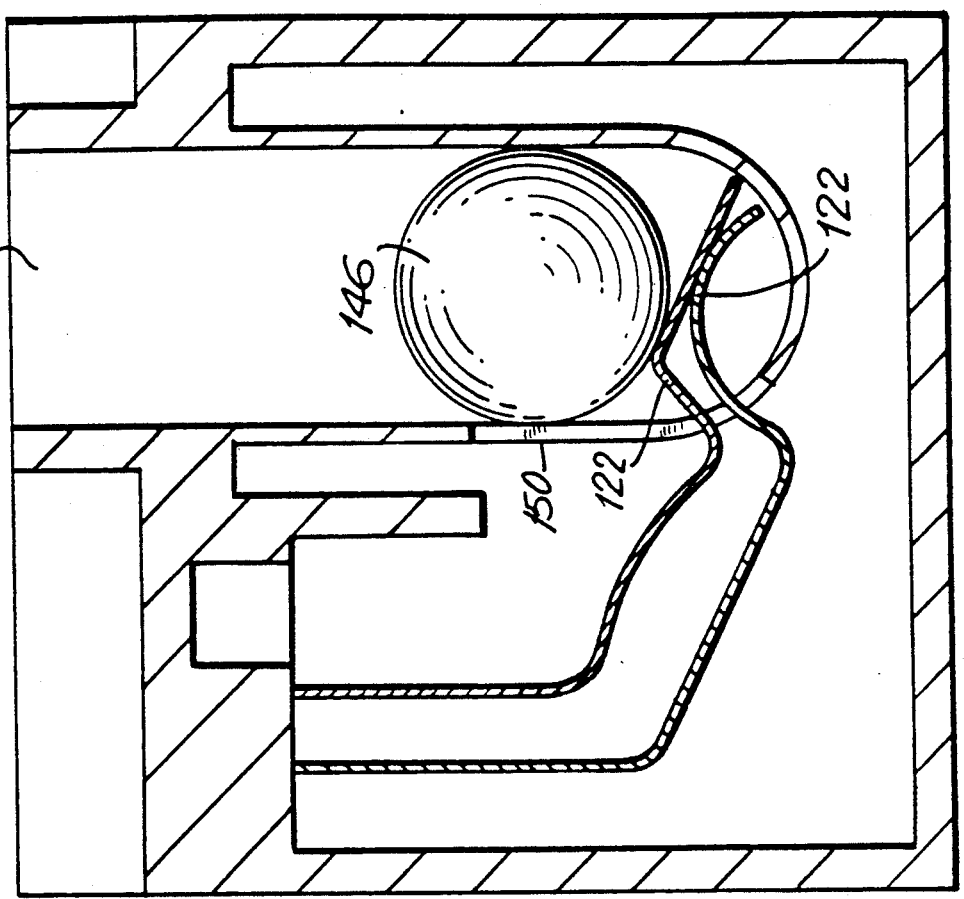
FIG. 5 shows a partial side-sectional view of an alternate embodiment of the invention with the ball in a first or rest position.
Figure 6:
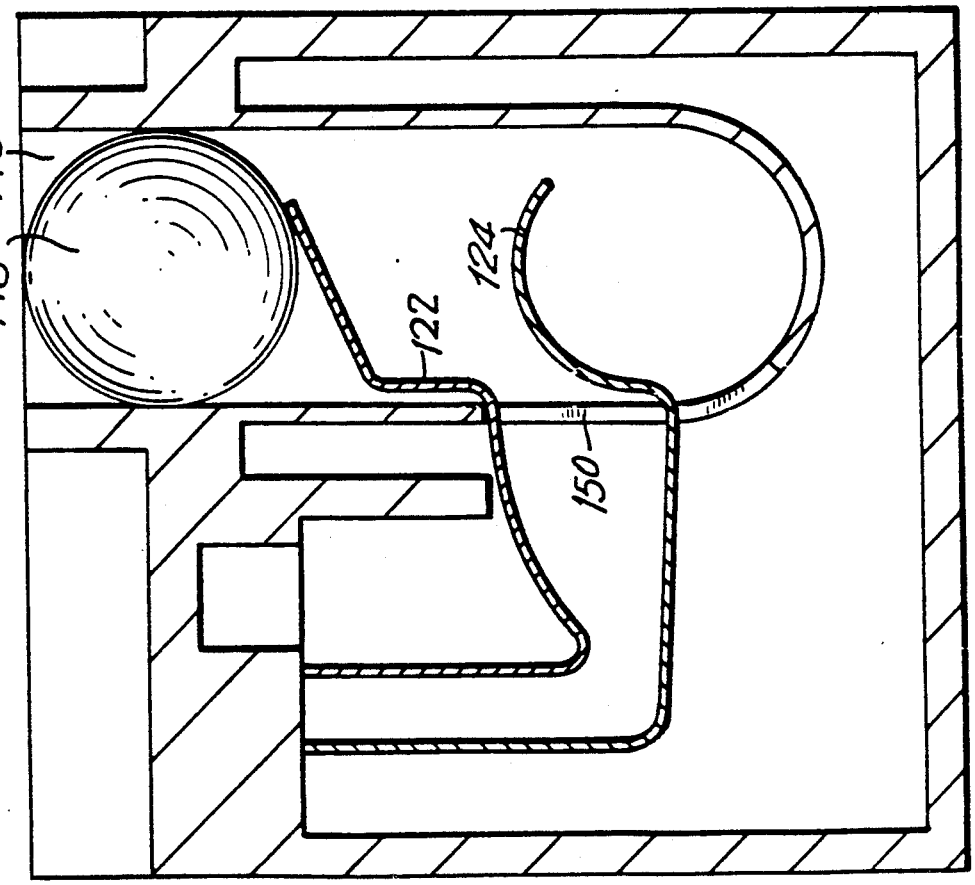
FIG. 6 shows the sensor of FIG. 5 with the ball in its final position.

An alternate embodiment of the invention is shown in FIGS. 5 and 6. The change of velocity sensor shown in these Figures includes two blades 122, 124, and a ball 146 similar in construction and arrangement to blades 22, 24 and ball 46 respectively, shown in FIGS. 1-4. However, in this embodiment ball 146 is disposed in a closed tubular chamber 148 with a narrow lateral slot 150. The blades 122, 124 extend through slot 150 into chamber 148. The cross-sectional diameter of chamber 148 is approximately equal or slightly larger than the diameter of ball 146. Therefore, in this embodiment, in addition to the action of the blades, the movement of the ball is also affected by the air disposed in the chamber 148, which acts as a damper. When the sensor is disposed in an automobile, and especially in the crush zone thereof, in the presence of a sudden deceleration, ball 146 moves downward from the rest position shown in FIG. 4, to an intermediate position in which blade 122 touches blade 124, and then to a final position shown in FIG. 6. With all other conditions being identical, the time from moment the ball 146 starts moving to the point at which the blades 122, 124 touch is slightly longer than for a senor constructed in accordance with FIGS. 1-4, resulting in a slightly more accurate and error free sensor.

Obviously numerous modifications can be made to the invention without departing from its scope as defined in the appended claims.

I claim:

1. An accelerometer for sensing velocity changes of a motor vehicle, said accelerometer comprising:
   a housing having a side wall, a first end and a second end;
   tubular path means for defining a path extending between said first and second ends substantially coextensively with the length of the housing;
   a first blade disposed at a first preselected distance from said first end and extending into said path;
   a second blade disposed at a second preselected distance from said first end smaller than said first blade and extending into said path; and
   an inertial mass disposed in and guided by said tubular path, said inertial mass being biased toward said first end by a biasing force generated by said first blade;
   said inertial mass being adapted to move in said tubular path in response to an acceleration toward said first end bending said first blade to contact said second blade.

2. The accelerometer of claim 1 wherein said path means includes a closed chamber housing said inertial mass.

3. The accelerometer of claim 2 wherein said chamber further includes a gas for dampening the movement of said inertial mass.

4. The accelerometer of claim 1 wherein said contacting means comprises a second blade.

5. The accelerometer of claim 4 wherein said first and second blades cooperated for slowing said inertial element down after contact is made between said first and said second blades.

6. The accelerometer of claim 1 wherein said path means comprises a tubular chamber holding said inertial element and a gas for dampening the movement of said inertial element.

7. A passenger restraint system for a motor vehicle comprising:
   a. an air bag arranged and disposed for restraining a passenger when the motor vehicle experiences a deceleration;
   b. air bag inflating means for inflating said air bag; and
   c. an accelerometer for sensing said deceleration for activating said air bag inflating means, said accelerometer comprising:
      i. a housing having a side wall, a first end and a second end;
      ii. tubular path means for defining a path extending between said first and second ends substantially coextensively with the length of the housing;
      iii. a first blade disposed at a a first preselected distance from said first end and extending into said path;
      iv. a second blade disposed at a second preselected distance from said first end smaller than said first blade and extending into said path; and
      v. an inertial mass disposed in and guided by said tubular path, said inertial mass being biased toward said first end by a biasing force generated by said first blade;

said inertial mass being adapted to move in said tubular path in response to an acceleration toward said first end bending said first blade to contact said second blade.

8. The system of claim 7 wherein said spring means comprises a first blade disposed in said housing and extending into said path.

9. The system of claim 8 further comprising a contact means disposed within said housing for contacting first blade as said inertial element moves from said first to a second position along said path.

10. The system of claim 9 wherein said contacting means comprises a second blade.

11. The system of claim 7 wherein said path means consists of a plurality of ribs extending within said housing.

12. The system of claim 7 wherein said path means comprises a closed chamber for housing said inertial element and a gas for dampening the movement of said inertial element.

13. The system of claim 12 wherein said chamber has a lateral slot, and wherein said blades extend into said chamber through said slot.

* * * * *